(12) United States Patent
McKenney (10) Patent No.: US 7,836,034 B2
(45) Date of Patent: Nov. 16, 2010

(54) METHOD AND APPARATUS FOR UPDATING FIRST DATA VALUE BEFORE SECOND DATA VALUE

(75) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 11/129,803

(22) Filed: May 16, 2005

(65) Prior Publication Data

US 2006/0259520 A1 Nov. 16, 2006

(51) Int. Cl.
*G06F 7/00* (2006.01)
*G06F 17/30* (2006.01)
*G06F 15/16* (2006.01)

(52) U.S. Cl. .................. 707/705; 707/781; 707/785

(58) Field of Classification Search .............. 707/9, 707/10, 101, 102, 200, 8, 201, 999.003, 999.104, 707/999.107, 705, 781, 785; 711/150, 1, 711/147, 163; 713/201; 710/107; 715/716–726; 726/1–36
See application file for complete search history.

(56) References Cited

U.S. PATENT DOCUMENTS

| | | | |
|---|---|---|---|
| 5,027,316 A | 6/1991 | Frantz et al. | |
| 5,226,143 A | 7/1993 | Baird et al. | |
| 5,283,830 A | 2/1994 | Hinsley et al. | |
| 5,452,460 A | 9/1995 | Distelberg et al. | |
| 6,341,340 B1 * | 1/2002 | Tsukerman et al. | 711/150 |
| 6,625,603 B1 * | 9/2003 | Garg et al. | 707/9 |
| 6,647,388 B2 * | 11/2003 | Numao et al. | 707/9 |
| 6,662,184 B1 | 12/2003 | Friedberg | |
| 6,711,571 B2 * | 3/2004 | Putzolu | 707/9 |
| 7,043,478 B2 * | 5/2006 | Martin et al. | 707/10 |
| 7,058,663 B2 * | 6/2006 | Johnston et al. | 707/200 |
| 7,107,270 B2 * | 9/2006 | Putzolu | 707/9 |
| 7,139,772 B2 * | 11/2006 | Bamford et al. | 707/102 |
| 2002/0026592 A1 * | 2/2002 | Gavrila et al. | 713/201 |
| 2004/0015642 A1 * | 1/2004 | Moir et al. | 711/1 |
| 2005/0071518 A1 * | 3/2005 | Samra et al. | 710/1 |
| 2006/0173885 A1 * | 8/2006 | Moir et al. | 707/101 |

\* cited by examiner

*Primary Examiner*—Cam Y Truong
*Assistant Examiner*—Cecile Vo
(74) *Attorney, Agent, or Firm*—Steven Lieske Bennett (57) ABSTRACT

A flag and a wait period are used to guarantee that readers of two data values see the updated first value before they see the updated second value, where the second value has to be updated after the first value is updated and thus is dependent on the first value. The first value is updated, and a flag associated with the first data value is set. The flag effectively prevents further updating of the first data value until it has been cleared. A length of time is waited for, such that any reading of the first data value and the second data value is guaranteed to not see the second data value as updated unless the first data value is also seen as updated. The flag is then cleared, such that further updating of the first data value can again occur. The second data value is finally updated.

15 Claims, 4 Drawing Sheets

METHOD AND APPARATUS FOR UPDATING FIRST DATA VALUE BEFORE SECOND DATA VALUE

FIELD OF THE INVENTION

The present invention relates generally to updating at least two data values, where one data value is dependent on another data value in that it has to be updated after the other data value has been updated, and more particularly to ensuring that reading the data values sees the data values as updated in the order of their dependency.

BACKGROUND OF THE INVENTION

Historically, computers, including computing systems and computing devices, were single-threaded. This means that at any given time, only one computer program, or task or thread of a computer program, was being executed. If a given thread was accessing a particular data value, the thread did not have to be concerned that other threads, or other tasks, were also accessing the data value. Therefore, the thread could read and update the data value as desired.

More recently, multi-threaded computers have become popular. Multi-threaded computers include single-processor systems that provide for multitasking, which allow for more than one thread or task of the same or different programs to be running at the same time, with the processor switching between executions of a number of different tasks over time. Multi-threaded computers also include multiple-processor systems, in which multiple threads and tasks of the same or different computer programs are concurrently running.

A reader of a data value is a thread or a task of a computer program, or other computer program code that is reading the data value. An updater of a data value is representative of a thread or a task of a computer program that is updating the data value. In multi-threaded systems, however, a given thread or task of a computer program cannot be guaranteed that it is the only reader or updater of a particular data value or data values.

For example, there may be a first data value and a second data value, where the second data value is dependent on the first data value, such that the first data value must first be updated and then the second data value must be updated. Furthermore, it must be guaranteed that readers first see the updated first data value before they see the updated second value. A concrete example of such data values is the providing of permissions to files within a file system. For a given file or group of files, there may be both an access control list (ACL) that governs access, as well as a set of permission bits that governs access. The ACL is a relatively granular access control, in that specific users, or groups of users, can be specified. By comparison, permission bits are less granular, in that either the owner of files can be specified, or a group of users including the owner of the files can be specified, and not just specific users within the group.

Consider the situation where the ACL and the permission bits for one or more files enable just the owner of the files, Frank, to access them. Frank is a member of a group that also includes Bob and Alice. The ACL may specify that the entire group, including Alice, Bob, and Frank, has access to the files. However, if the permission bits just specify Frank, then only Frank can access the files. This is because the access control mechanisms are restrictive in a conjunctive manner—both the ACL and the permission bits must provide a given user with access in order for that user to have access to the files. In this example, only Frank is given access by both the ACL and the permission bits, so only Frank has access to the files.

Now, Frank may want Bob to have access to the files, too, but not Alice. This requires two changes. First, the ACL must be updated to specify Bob and Frank, but not Alice. Second, the permission bits must be updated so that the group of users including Bob has access to the files. The permission bits allow Alice, Bob, and Frank to have access to the files, but because the ACL only specifies Bob and Frank, Alice does not obtain access to them.

For this modification in access to the files to work, the ACL has to be updated before the permission bits are updated. This is because if the permission bits are updated first, they will be updated to allow the entire group of users, Alice, Bob, and Frank, to have access to the files. Because the ACL originally specifies that the entire group of users has access, this means that if the permission bits are updated first, there will be a short period of time in which Alice has access, before the ACL is changed to restrict access to only Bob and Frank. The permission bits ultimately have to be updated to accord Bob access, because they originally specify that only Frank has access.

Furthermore, it has to be guaranteed that even if the ACL is updated before the permission bits are updated, any readers of the ACL and the permission bits see the updated ACL before the updated permission bits. As before, if a reader sees the updated permission bits before the updated ACL, it may improperly give Alice access to the files, which is not desired. Readers, therefore, have to see the changes made to the ACL before they see the changes made to the permission bits.

One way to ensure that the ACL is updated before the permission bits are and that readers see the updated ACL before the updated permission bits is to employ locks. An updater may, for instance, place locks on both the ACL and the permission bits. The updater updates the ACL first, then updates the permission bits, and finally releases the locks on both the ACL and the permission bits. While the updater has locks on the ACL and the permission bits, no other updater, and no reader, can access the ACL and the permission bits. However, locks can inflict an unacceptable degradation in performance, and therefore can be undesirable in some situations.

Another way to ensure that the ACL is updated before the permission bits are and that readers see the updated ACL before the updated permission bits is to force updaters to wait for a length of time after making any update. Thus, an updater may update the ACL, be forced to wait for a length of time, then update the permission bits, and be forced to wait for another length of time. The length of time is sufficiently long that any readers of both the ACL and the permission bits will always see the updated ACL before they see the updated permission bits.

However, forcing updaters to wait for a length of time after making any update introduces needless latency in many situations. For example, the system has no way of knowing that an update to the ACL will be followed by an update to the permission bits. Where the ACL is updated, but not the permission bits, the updater still has to wait for the length of time after updating the ACL. Similarly, where the updater is just updating the permission bits, it still has to wait for the length of time after making the update. Such excessive and unneeded latency may cause system-wide performance degradation.

An additional way to ensure that the ACL is updated before the permission bits are and that readers see the updated ACL before the updated permission bits is to use barriers of the type employed in high-performance computing (HPC) systems, to separate an update to the ACL from an update to the permission bits. Thus, the update to the ACL is made, a barrier is imposed, an update to the permission bits is made, and then the barrier is removed. The barrier prevents readers from seeing the updated permission bits before seeing the updated ACL. However, such barriers involve high overhead typically, similar to as in employing locks. Furthermore, such barriers impose "data skew," in the sense that threads that arrive at the barrier must wait idly, wasting time that could otherwise be used.

For these and other reasons, therefore, there is a need for the present invention:

SUMMARY OF THE INVENTION

The present invention relates to using a flag and a wait period to guarantee that readers of two data values see the updated first value before they see the updated second value, where the second value has to be updated after the first value is updated and thus is dependent on the first value. A method of the invention is implemented in software, and updates the first value, and then sets a flag associated with the first data value. The flag effectively prevents further updating of the first data value until it has been cleared, because updaters can only update the first data value if the flag is cleared. The method then waits for a length of time, such that any reading of the first data value and the second data value is guaranteed to not see the second data value as updated unless the first data value is also seen as updated. That is, the length of time is sufficiently long such that readers will always see the updated first data value before they see the updated second data value. The method next clears the flag after the length of time has been waited for, such that further updating of the first data value can again occur. The method finally updates the second data value.

Another method of the invention determines that a first data value is to be updated. The first data value is dependent on one or more second data values. Each second data value has a flag associated therewith. The method examines the flag associated with each second data value. Where the flag associated with any second data value is set, the method waits until the flags for all of the second data values are cleared before updating the first data value. Thus, where the flags associated with all of the second data values are cleared, the method updates the first data value. The first data value-and the second data values may be part of a graph of data values. In such instance, the first data value is directly dependent on one of the second data values, and each of the second data values is directly dependent on at most one and only one of the second data values.

Another method of the invention is for changing access accorded to one or more files, as controlled by both an access control list (ACL) and one or more permission bits. Updating of the ACL is required to occur before updating of the permission bits, in a manner which guarantees that any reading of the ACL and the permission bits will always see the updated ACL prior to seeing the updated permission bits. The method updates the ACL, and sets a flag indicating that a change has recently been made to the ACL. The method waits for a length of time, and clears the flag after the length of time has been waited for. The method finally updates the permission bits. Any further updating of the ACL cannot occur until the flag has been cleared, such that the flag effectively prevents further updating of the ACL until the flag is cleared. However, any reading of the access control list and the permission bits is able to occur without the readers having to first check the flag, or employ locking.

A system of the invention includes one or more processors and a memory communicatively coupled to the processors. The memory stores a first data value and a second data value that are required to be updated in that order when the first and the second data values are both to be updated. The memory further stores a flag associated with the first data value. The flag is set when the first data value is updated, and is cleared after a length of time has been waited for upon setting of the flag. The flag is further examined before any-updating of the first data value occurs. Any updating of the first data value occurs only when the flag is cleared and not set.

An article of manufacture of the invention includes a computer-readable medium and means in the medium. The medium may be a recordable data storage medium, a modulated carrier signal, or another type of computer-readable medium. The means is for updating both a first data value and a second data value that is dependent upon the first data value, such that reading of the first and the second data values is guaranteed to not see the updated second value unless it also sees the updated first value, when both the first and the second data values are updated. The means employs a flag associated with the first data value that is set upon updating the first data value and that is subsequently cleared after waiting for a length of time after setting of the flag.

Embodiments of the invention provide for advantages over the prior art. For instance, both an ACL and permission bits according access to one or more files in a conjunctively restrictive manner may have to be updated, in that both the ACL and the permission bits have to accord a user access to the files for the user to actually have access to them. The invention causes the ACL to be updated, a flag to be set, and then a period of time to be waited for before clearing the flag and updating the permission bits. The period of time is sufficiently long that any readers of both the ACL and the permission bits will see the updated ACL before they see the updated permission bits. Other updaters of at least the ACL cannot perform their updates until the flag has been cleared, after waiting for the length of time.

Embodiments of the invention thus differ from the prior art in two novel ways. First, locking is not employed by the invention when updating the ACL or when updating the permission bits, providing embodiments of the invention with performance advantages over the prior art approaches that do employ locking. Second, the flag is set, and thus the period of time is waited for before clearing the flag, only when both the ACL (viz., the first data value) and the permission bits (viz., the second data value dependent on the first data value) have or need to be updated. If only the ACL or only the permission bits have or need to be updated, then the flag does not have to be set in at least some embodiments, and the length of time does not have to be waited for. This is in comparison with the prior art approach that waits for the length of time when any update is made of either the ACL or the permission bits, even when just the ACL is being updated, or just the permission bits are being updated, and not both the ACL and the permission bits are being updated. As such, the excessive latency introduced by the prior art is significantly reduced by such embodiments of the invention, because the length of time is waited for only in a particular situation—when both the ACL and the permission bits have to be changed, in that order.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview and Method

Figure 1:
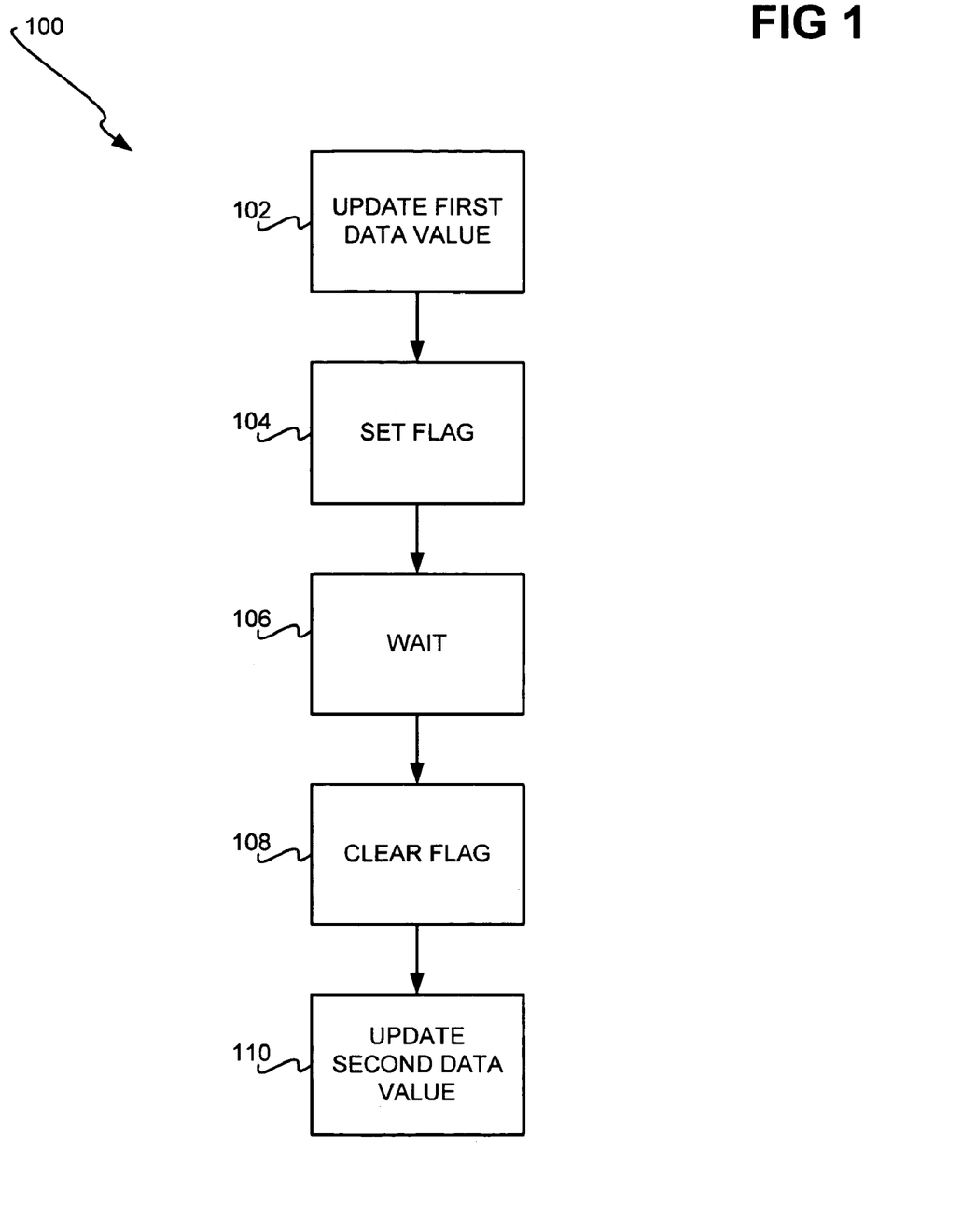
FIG. 1 is a flowchart of a method for updating a first data value and a second data value that is dependent upon the first data value, according to an embodiment of the invention, and is suggested for printing on the first page of the patent.

FIG. 1 shows a method 100 for updating a first data value and a second data value that is dependent upon the first data value, according to an embodiment of the invention. The second data value is dependent upon the first data value in that when both the first and the second data values are to be updated, the first data value is required to be updated before the second data value is updated. The method 100 ensures that readers of the first and the second data values will always see the first data value as updated before they see the second data value as updated. That is, the method 100 guarantees that readers will not see the updated second data value unless they also see the updated first data value.

Embodiments of the invention are not limited to the type or kind of the first and the second data values. In one embodiment, the data values may be related to access control of one or more files of a computer system. For example, the first data value may be an access control list (ACL) that specifies which users are able to access the files, and the second data value may be one or more permission bits that specify whether the owning user of the files, or a group of users including the owning user, is able to access the files. In such an embodiment, the two data values are conjunctively restrictive of access control to the files, such that a user must be permitted access to the files by both the ACL and the permission bits in order to have access to the files. That is, if the user only has access permitted by just the ACL or just the permission bits, then he or she does not obtain access to the files. Such access control-related data values are described in more detail later in the detailed description. Embodiments of the invention can further be extended to more than two data values, as is also described in more detail later in the detailed description.

The first data value is updated (102). Updating the first data value encompasses changing or modifying the contents of the first data value. The contents of the first data value may be atomically updated, as is described in more detail later in the detailed description. Next, a flag associated with the first data value is set (104). The flag indicates that a change has recently been made to the first data value. The flag effectively prevents further updating of the first data value until the flag has been cleared. That is, other updates to the first data value first examine the flag to determine whether it has been set. If the flag has been set, the updates are not made until the flag is cleared. Thus, setting the flag associated with the first data value blocks further updating of the first data value until the flag has been cleared.

A length of time is then waited for (106). The length of time is sufficiently long so that any reading of both the first and the second data values is guaranteed to not see the updated second data value unless the updated first data value is also seen. That is, the latency introduced by waiting for the length of time guarantees that the updated first data value is always seen before the updated second data value. Readers of the first and the second data values do not have to employ any type of locking relative to these data values in one embodiment of the invention, nor do they have to check the flag associated with the first data value. It is noted that the length of time being waited for in 106 differs from lengths of time that are waited for in the prior art. Specifically, in embodiments of the invention, the length of time is waited for only if both the first and the second data values need to be updated, whereas in the prior art, a length of time may always be waited for after the first data value is updated, regardless of whether the second data value also has to be updated.

The flag associated with the first data value is cleared after the length of time has been waited for (108). This means that further updating of the first data value can now again occur. The second data value that is dependent upon the first data value is finally updated (110). Updating the second data value encompasses changing or modifying the contents of the second data value. The contents of the second data value may be atomically updated, as is described in more detail later in the detailed description. It is noted that each of the first and the second data values may in one embodiment be more than one data value. That is, the first data value may itself be a set of data values, and the second data value may itself be a set of data values.

The length of time may be waited for, and the flag being cleared thereafter, in 106 and 108 of the method 100 of FIG. 1 in a variety of different manners. For instance, a read-change update (RCU) callback may be employed, where the flag is set, and an RCU routine is called or scheduled to clear the flag after the appropriate length of time has been waited for, as can be appreciated by those of ordinary skill within the art. Furthermore, a kernel synchronization primitive may be called relative to the first data value, which clears the flag after the desired length of time has been waited for, as can also be appreciated by those of ordinary skill within the art. A semaphore can also be used, as those of ordinary skill within the art can appreciate.

The method 100 is employed only where both the first and the second data values are to be updated. If just the first data value, or just the second data value, is to be updated, then in at least some embodiments, the method 100 is not performed. That is, the flag associated with the first data value does not have to be set, such as in 104 of the method 100, a length of time does not have to be waited for, such as in 106 of the method 100, and the flag does not have to be cleared, such as in 108 of the method 100. However, updates to just the first data value do have to check that the flag is cleared, and is not currently set, only update the first data value where the flag is cleared, and otherwise wait for the flag to become cleared if it has been set.

Technical Background and Description

Figure 2:
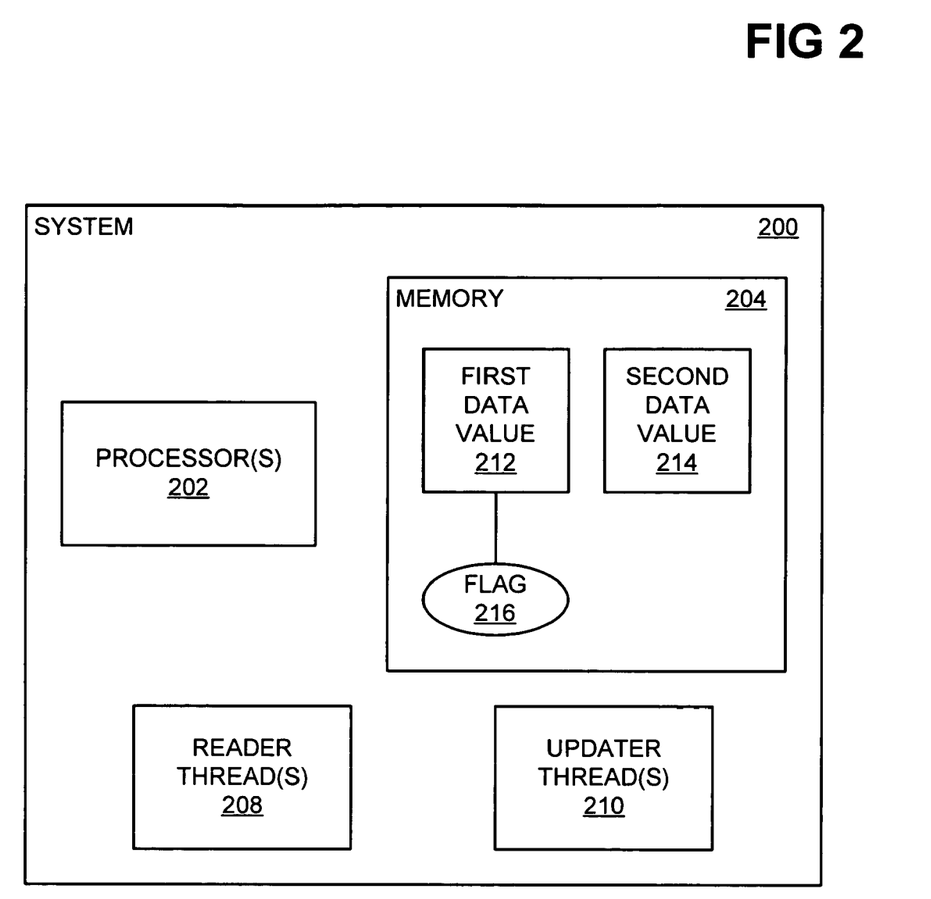
FIG. 2 is a diagram of a system in which there is a memory storing a first data value, a second data value dependent upon the first data value, and a flag associated with the first data value and indicating whether the first data value has recently been updated, according to an embodiment of the invention.

FIG. 2 shows a system 200, according to an embodiment of the invention. The system 200 includes one or more processors 202, and memory 204. As can be appreciated by those of ordinary skill within the art, the system 200 may include components in addition to and/or in lieu of those depicted in FIG. 2. The system 200 may be a single computer or computing device, or may encompass multiple computers, computing devices, or nodes. In a multiple-node system, the processors 202 may be divided among the various nodes, such that each node includes one or more of the processors 202.

The memory 204 stores a first data value 212 and a second data value 214. As has been described, the second data value 214 is dependent upon the first data value 212, in that when both the data values 212 and 214 are to be updated, the first data value 212 is required to be updated before the second data value 214. Furthermore, updates made to the first data value 212 are required to be seen before updates made to the second data value 214, when both the first and the second data values 212 and 214 are updated.

The memory 204 also stores a flag 216 associated with the first data value 212. As has been described, once the first data value 212 has been updated, the flag 216 is set. Further updating of the data value 212 has to wait until the flag 216 is cleared. That is, the flag 216 blocks or prevents further updating of the data value 212 when the flag 216 has been set. After a length of time has elapsed, the flag 216 is cleared after it has been set, and the second data value 214 is updated. This length of time is sufficient so that reading both the first and the second data values 212 and 214 is guaranteed to see the updated first data value 212 before the updated second data value 214.

There are two types of threads depicted in the system 200: one or more reader threads 208, and one or more updater threads 210. As used herein, a thread is representative of any type of computer program code, such as a thread of a computer program, a task of a computer program, and so on. The reader threads 208 each read the data values 212 and 214 as described herein. The updater threads 210 each update the data values 212 and 214 as described herein.

Furthermore, a given thread may be a reader thread or an updater thread at different points in time. For example, a given task may first read the data values 212 and 214, at which time it is a reader thread in accordance with certain embodiments of the present invention. Thereafter, the task may update the data values 212 and 214, at which time it is an updater thread. The threads 208 and 210 are specifically executed by one or more of the processors 202 from the memory 204, although this is not particularly depicted in FIG. 2 for illustrative clarity.

Figure 3:
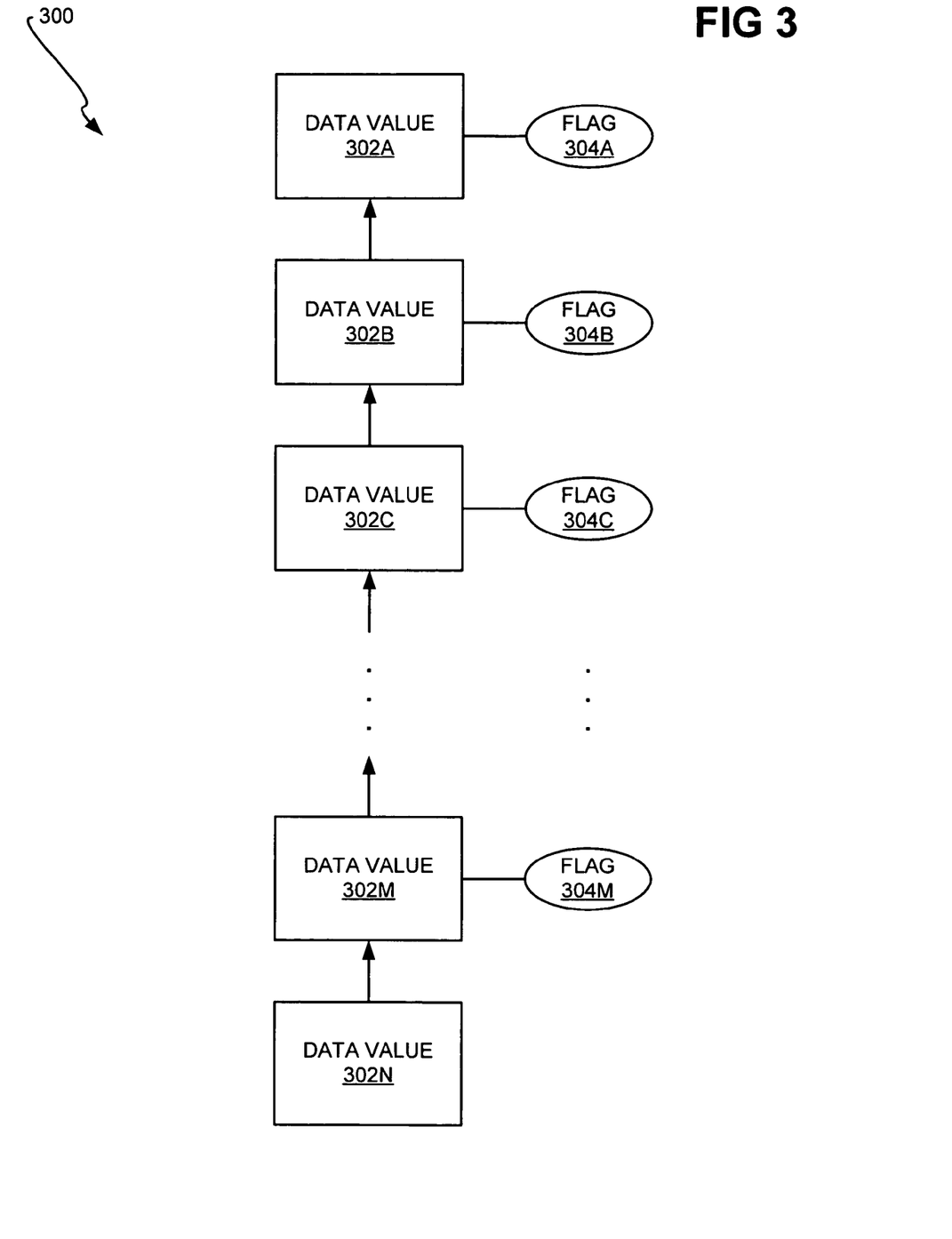
FIG. 3 is a diagram of a graph of more than two data values, and further indicates how embodiments of the invention can be extended to more than two data values, according to an embodiment of the invention.

Embodiments of the invention have thus far been described in which there is a first data value and a second data value that is dependent upon the first data value, such that the first data value has a flag associated therewith indicating that the first data value has been recently updated. However, other embodiments of the invention are applicable and can be extended to there being more than two data values. For instance, FIG. 3 shows a graph 300 of a number of data values 302A, 302B, ..., 302M, 302N, according to an embodiment of the invention.

The data values 302A, 302B, ..., 302M, 302N are collectively referred to as the data values 302. Except for the first data value 302A, each of the data values 302 is directly dependent on an immediately preceding data value. For example, the data value 302B is directly dependent on the data value 302A, the data value 302C is directly dependent on the data value 302B, and the data value 302N is directly dependent on the data value 302M. The first data value 302A is not dependent on any other of the data values 302.

Except for the first two data values 302A and 302B, each of the data values 302 is also indirectly dependent on at least one preceding data value. For example, the data value 302C, while directly dependent on the data value 302B, is also indirectly dependent on the data value 302A, because the data value 302B is directly dependent on the data value 302A. Stated another way, the data value 302C is dependent on both the data values 302A and 302B, because it is directly dependent on the data value 302B and is indirectly dependent on the data value 302A. As another example, the data value 302N is directly dependent on the data value 302M, and is indirectly dependent on all the data values preceding the data value 302M. As a final example, the data value 302B is directly dependent on the data value 302A, and is not indirectly dependent on any data value, because the data value 302A itself is not directly dependent on any data value.

Dependence among the data values 302 means that if a given of the data values 302 is to be updated, none of the other data values 302 on which it depends can have been recently updated, and in one embodiment the data value itself cannot have been recently updated. Therefore, except for the last data value 302N, each of the data values 302 has an associated flag. Specifically, the data values 302A, 302B, 302C, ..., 302M have associated flags 304A, 304B, 304C, ..., 304M, collectively referred to as the flags 304. Each of the flags 304 indicates that the data value with which it is associated has recently been updated, as has been described. The data value 302N does not have an associated flag because it is the last data value within the graph 300, and the data value 302N does not have any data values dependent on it.

A given of the data values 302 can only be updated if the flags associated with the other data values on which it depends, if any, are cleared, and are not set, and, in one embodiment, where its associated flag; if there is such a flag, is also cleared, and not set. For example, the data value 302C can be updated only if the flags 304B and 304A are cleared, denoting that the data values 302B and 302A on which the data value 302C depends have not been updated during the lengths of time that are waited for before the flags 304B and 304A are cleared. In one embodiment, the data value 302C can further only be updated if the flag 304C is also cleared, denoting that the data value 302C has not been updated during the length of time that is waited for before the flag 304C is cleared.

Clearing of the flags 304 is accomplished in a manner similar to as has been described when there are only two data values, instead of more than two data values 302, as in FIG. 3. Consider the example where the data values 302B and 302C are to be updated. First, the data value 302B is updated only where the flag 304A is cleared, and in one embodiment also where the flag 304B is cleared. Assuming this is the case, the data value 302B is updated, and the flag 304B is set. A length of time is waited for, after which the flag 304B is cleared. The data value 302C is then updated, presuming that the flags 304A and 304B remain cleared, and in one embodiment that the flag 304C is also cleared. A length of time is waited for, after which the flag 304C is also cleared.

Figure 4:
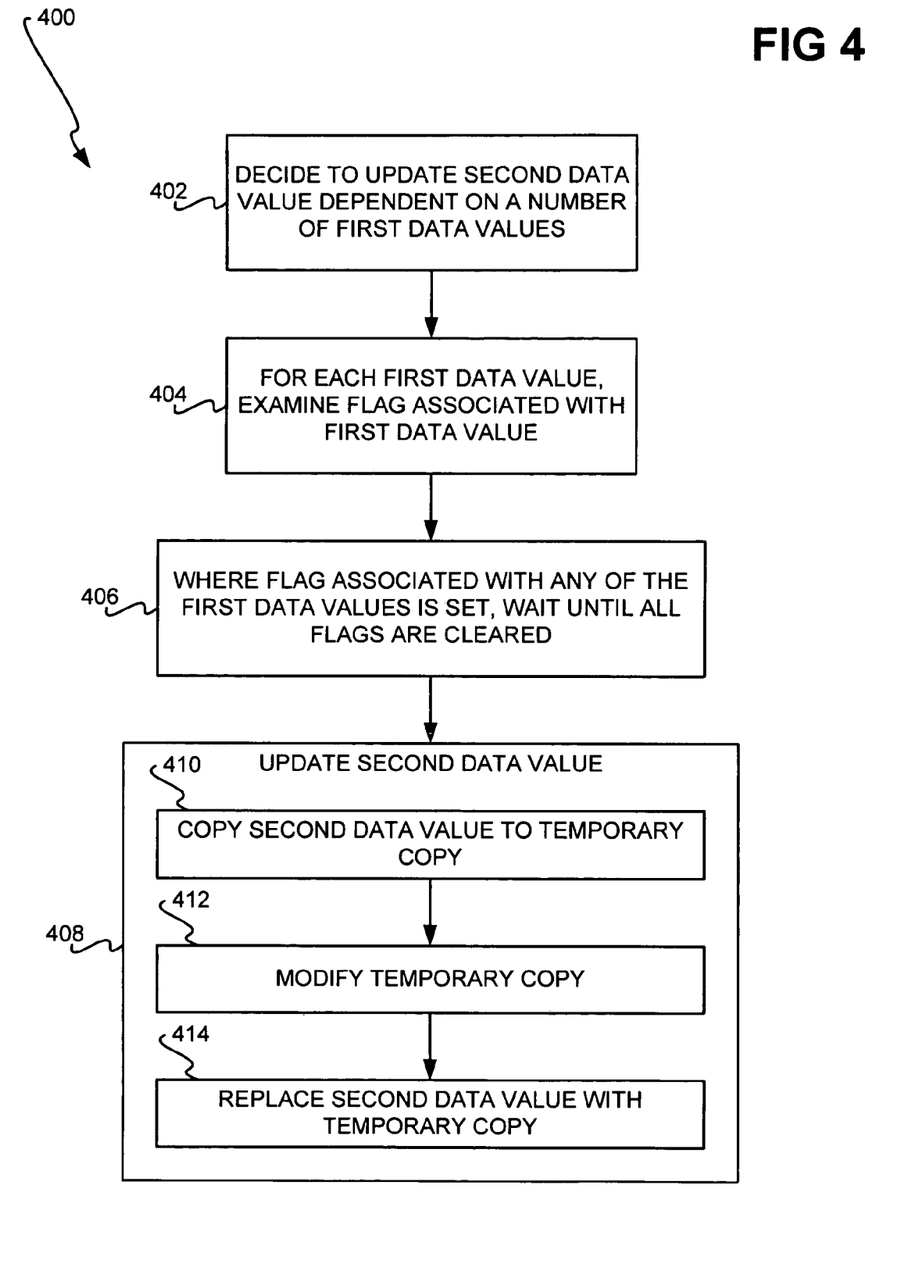
FIG. 4 is a flowchart of a method for updating a second data value dependent upon a number of first data values and which is consistent with but more detailed than the method of FIG. 1, according to an embodiment of the invention.

Detailed Method FIG. 4 shows a method 400 for updating a second data value that is dependent upon one or more first data values, according to an embodiment of the invention. The method 400 may be employed where there is one first data value and one second data value, and the first data value has already been updated. The method 400 may also be employed where there is more than one first data value and there is one second data value. An example of this latter situation is when one of the data values 302C, . . . , 302M, 302N of the graph 300 of FIG. 3 is to be updated.

The method 400 thus starts with the decision that the second data value is to be updated (402). The method 400 examines the flag associated with each first data value (404) to which the second data value depends directly or indirectly. If the flag associated with any of the first data values is set, the method 400 waits until all the flags associated with the first data values are cleared (406). In other words, the flags associated with all the first data values upon which the second data value is dependent, directly or indirectly, have to be cleared before proceeding. In one embodiment, where the second data value itself has one or more data values dependent on the second data value, such that the second data value itself has an associated flag, this flag must also be cleared before proceeding with updating of the second data value.

The second data value is then updated (408). In one embodiment, updating of the second data value is accomplished in an atomic manner, such that the entire updating process is performed as one operation. For instance, the second data value may be copied to a temporary copy thereof (410), the temporary copy modified, or updated, as desired (412), and then the second data value may be replaced with this modified temporary copy (414), where 410, 412, and 414 are accomplished in an atomic manner. Performing 410, 412, and 414 in an atomic manner means that all of 410, 412, and 414 are performed, or that none of 410, 412, and 414 are performed. This atomic updating procedure may further be used when updating any data value as has been described herein.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

What is claimed is:

1. A method performed in software comprising:
   updating a first data value upon which a second data value is dependent such that the first data value and the second data value are required to be updated in that order such that the first data value is updated before the second data value is updated, when the first data value and the second data value are both to be updated, where updating the first data value comprises changing or modifying contents of the first data value;
   setting a flag associated with the first data value, such that the flag effectively prevents further updating of the first data value until the flag has been cleared;
   waiting for a length of time, such that any reading of the first data value and the second data value is guaranteed to not see the second data value as updated unless the first data value is also seen as updated, where the length of time is waited for without employing locking;
   clearing the flag after the length of time has elapsed, to permit further updating of the first data value; and,
   updating the second data value dependent upon the first data value, where updating the second data value comprises changing or modifying contents of the second data value,
   wherein the method is performed without employing locking.

2. The method of claim 1, wherein any reading of the first data value and the second data value occurs without having to check the flag associated with the first data value.

3. The method of claim 1, wherein any reading of the first data value and the second data value occurs without having to employ locking relative to the first data value and the second data value.

4. The method of claim 1, wherein updating the first data value comprises atomically updating the first data value.

5. The method of claim 1, wherein updating the first data value comprises performing, as a single operation:
   copying the first data value to a temporary copy of the first data value;
   modifying the temporary copy of the first data value; and,
   replacing the first data value with the temporary copy of the first data value as modified.

6. The method of claim 1, wherein setting the flag associated with the first data value results in blocking of further updating of the first data value until the flag has been cleared.

7. The method of claim 1, wherein waiting for the length of time and clearing the flag after the length of time has elapsed comprises scheduling a read-copy update (RCU) callback.

8. The method of claim 1, wherein waiting for the length of time comprises calling a kernel synchronization primitive relative to the first data value.

9. The method of claim 1, wherein waiting for the length of time comprises employing a semaphore.

10. The method of claim 1, wherein the first data value is an access control list associated with one or more files.

11. The method of claim 10, wherein the second data value is a plurality of permission bits associated with the one or more files, such that the access control list is updated prior to the permission bits being updated when both the access control list and the permission bits are to be updated.

12. The method of claim 1, wherein each of the first and the second data values comprises a plurality of data values.

13. A method comprising:
   determining that a first data value is to be updated, where the first data value is dependent on one or more second data values such that the second data value and the first data value are required to be updated in that order such that the second data value is updated before the first data value is updated, each of the second data values having a flag associated therewith, where updating the first data value comprises changing or modifying contents of the first data value and where updating the second data value comprises changing or modifying contents of the second data value;
   examining the flag associated with each of the second data values;
   where the flag associated with any of the second data values is set, waiting for a length of time until the flag is cleared for each of the second data values before updating the first data value, where the length of time is waited for without employing locking; and, updating the first data value, wherein the method is performed without employing locking.

14. The method of claim 13, wherein the first data value has a third data value dependent thereon, the method further comprising attempting to update the third data value, by:

examining the flag associated with the first data value;

examining the flag associated with each of the second data values;

where the flag associated with any of the first data value and the second data values is set, waiting until the flag is cleared for each of the first data value and the second data values before updating the third data value; and, updating the third data value.

15. The method of claim 13, wherein the first data value and the second data values are part of a graph of data values, the first data value being directly dependent on one of the second data values, and each of the second data values being directly dependent on at most one other of the second data values.

* * * * *